United States Patent [19]

Hufford

[11] Patent Number: 5,193,974

[45] Date of Patent: Mar. 16, 1993

[54] DYNAMIC PRESSURE RECOVERY SEAL
[75] Inventor: Larry A. Hufford, Vista, Calif.
[73] Assignee: BW/IP International, Inc., Long Beach, Calif.
[21] Appl. No.: 724,195
[22] Filed: Jul. 1, 1991
[51] Int. Cl.[5] ............................................. F01D 11/00
[52] U.S. Cl. .................................. 415/112; 415/111; 415/171.1; 277/74; 277/75
[58] Field of Search ................... 415/170.1, 171.1, 104, 415/111, 112, 113; 277/74, 75, 81 R, 93 R, 93 SD

[56] References Cited

U.S. PATENT DOCUMENTS

| 3,527,465 | 9/1970 | Guinard ............................... 277/74 |
| 3,804,424 | 4/1974 | Gardner ............................... 277/74 |
| 3,905,605 | 9/1975 | Hubner ................................ 277/75 |
| 4,196,911 | 4/1980 | Matsushita ........................... 277/75 |
| 4,383,720 | 5/1983 | Ernst . |
| 4,706,966 | 11/1987 | Lind ...................................... 277/75 |
| 4,759,553 | 7/1988 | Goodman et al. ................... 277/75 |
| 4,902,197 | 2/1990 | Rhodes et al. ....................... 415/111 |
| 4,961,678 | 10/1990 | Janocko ............................... 277/74 |

FOREIGN PATENT DOCUMENTS 0063062 10/1982 European Pat. Off. .
0354470 2/1990 European Pat. Off. .
140662 6/1953 Sweden ................................ 277/74
554331 6/1943 United Kingdom ................ 277/75

OTHER PUBLICATIONS

Annex to the International Search Report on International Patent Application No. US 9205546 Dated: Sep. 2, 1992.

Primary Examiner—Thomas E. Denion
Attorney, Agent, or Firm—Pretty, Schroeder, Brueggemann & Clark

[57] ABSTRACT

A mechanical seal assembly for use in a pump seal chamber, through which a pump shaft rotates and in which a process fluid is contained by a stationary seal and a rotating seal, converts the velocity head of the circulating process fluid in the seal chamber back to a positive static pressure at the stationary seal and rotating seal faces and ensures a steady film of the process fluid at the seal faces. The mechanical seal assembly converts the velocity head to a positive static pressure through one or more velocity recovery tubes that project outwardly from the pump housing into the sealed chamber, or that project outwardly from the rotating seal into the seal chamber, and communicate with respective passages through the seals and channel the process fluid to the seal faces.

9 Claims, 3 Drawing Sheets

DYNAMIC PRESSURE RECOVERY SEAL

BACKGROUND OF THE INVENTION

1. Field of the Invention

This invention relates generally to seals and, more particularly, to mechanical seal assemblies that are used to seal the rotating shafts of pumps and compressors against atmospheric air.

2. Description of the Related Art

Mechanical seals are used with centrifugal pumps and compressors, which have a rotating element, such as a pump impeller, and a stationary element, such as a pump casing. The impeller rotates in an impeller cavity of the casing. In a typical centrifugal pump, a process fluid is forced or drawn into the impeller cavity near the center of the rotating impeller. The impeller includes vanes that circumferentially rotate the fluid within the impeller cavity, increasing the fluid pressure toward the outer wall of the cavity. The fluid pressure then causes the process fluid to be directed out of the cavity at a port in the casing periphery. A centrifugal pump also can be made to operate in an opposite manner to provide suction, drawing fluid into the impeller cavity from a port in the casing and directing the fluid out of the impeller cavity near the impeller's center.

The pump impeller shaft projects out of the pump casing so that it can be coupled to a drive mechanism. The pump shaft must be adequately sealed against outside atmospheric air, where the shaft projects out of the casing, to keep the process fluid in and the atmospheric air out. Mechanical seals perform this sealing function. A typical mechanical seal includes two sealing faces extending around the impeller shaft in a plane that is perpendicular to the shaft. One sealing face is part of a stationary seal that is fixed to the casing, and the other sealing face is part of a rotating seal that is fixed to the shaft and that rotates relative to the casing. The stationary seal and rotating seal ordinarily are pressed together by a spring or bellows assembly. The seals prevent the process fluid from readily leaking out the impeller cavity along the impeller shaft to the atmosphere.

The stationary seal, rotating seal, and bellows fit around the pump impeller shaft within an annular-shaped seal chamber of the casing. Generally, before the pump is operated, the impeller cavity is filled with process fluid, which can then flow into the seal chamber and fill it. Those skilled in the art will recognize that some pump designs fill the seal chamber with other fluids. Although the two seals are forced together by the spring or by the bellows assembly, there is generally a sufficient static fluid pressure in the seal chamber to force process fluid into the small gap between the seal faces such that a very thin film of process fluid, perhaps only a fluid vapor, can eventually work its way past the seal faces and out along the pump shaft to the outside atmosphere. Thus, the seal faces are kept axially separated by the thin film of process fluid, which acts as a lubricating agent to decrease wear on the seals and acts as a barrier against atmospheric air to prevent the seals from running dry.

In the fluid-filled annular seal chamber, the pump impeller shaft drags some of the process fluid along with it as it rotates, due to surface friction between the shaft and the fluid. As a result, the process fluid circulates in the seal chamber in the direction of shaft rotation. The process fluid in the annular seal chamber closest to the rotating shaft is driven at the greatest circumferential velocity, while the fluid farthest from the shaft, near the outside wall of the seal chamber, is driven at the least circumferential velocity. In a closed system such as the seal chamber, increasing the velocity of a fluid generally reduces that fluid's static pressure and converts it to a velocity pressure or stream force. That is, the static pressure and velocity pressure together equal a fixed absolute pressure. Therefore, because the fluid in the annular seal chamber closest to the impeller shaft is driven to the greatest velocity, the fluid closest to the impeller shaft is driven to the greatest reduction in static pressure. Thus, the static pressure of the process fluid adjacent the seal faces is reduced when the impeller spins.

Mechanical seals of relatively large diameter and low initial fluid static pressure can sometimes be run at a sufficiently high speed to suffer from a reduction in static pressure at the seal faces from the initial value all the way down to atmospheric levels or even below. If the reduction in static pressure is to atmospheric level or below, then the process fluid static pressure at the seal faces will not be sufficient to maintain a fluid film between the seal faces. This loss of the fluid film between the seal faces quickly causes the seal faces to run dry. This increases the friction between the seal faces and leads to seal damage or unreliable seal performance.

Conventionally, the loss of static pressure at the seal faces due to rotation of the pump impeller shaft sometimes can be solved by increasing the initial static pressure of the process fluid in the seal chamber or by designing the seal for internal pressurization to a pressure sufficient to endure the static pressure losses to velocity pressure. These solutions, however, can be very costly and complicated to implement, and structural or space limitations can make both of these solutions impractical.

From the discussion above, it should be apparent that there is a need for an improved mechanical seal that provides an effective seal around a rotating shaft and that prevents an excessively high loss of static pressure at the seal faces. The present invention satisfies this need.

SUMMARY OF THE INVENTION

The invention provides a mechanical seal assembly for use in a pump seal chamber through which a pump shaft rotates and in which a process fluid is contained by a stationary seal and a rotating seal, the mechanical seal assembly having at least one velocity recovery element that converts the velocity pressure of the circulating process fluid in the seal chamber back to a positive static pressure at the stationary seal and rotating seal faces and ensures a steady film of the process fluid at the seal faces, even for large-diameter, high-speed seals. The fluid entering the velocity recovery element has a high velocity pressure, which is converted to a relatively high static pressure at the seal faces. The velocity recovery element can include a process fluid conduit that begins with an open end that projects into the stream of circulating process fluid, continues through one or more seal elements, and terminates in an opening in the seal face, thereby directing a flow of the process fluid to the seal faces. Thus, the velocity head of the process fluid in the seal chamber is converted to a static pressure at the seal faces.

The velocity recovery element can include a tube that projects into the seal chamber and that communicates with a passage through the housing and through the stationary seal. The open end of the tube, which projects into the seal chamber, is directed into the oncoming flow of the circulating process fluid to collect process fluid and channel it into the housing and then into the stationary seal. The passage through the stationary seal ends in an enlarged exit pocket in the stationary seal face. When the pump shaft rotates and causes the process fluid to circulate around the seal chamber, a portion of the circulating process fluid is captured by the fixed velocity recovery tube or element and its velocity head is converted to a static pressure. The fluid is then forced through the stationary housing to the stationary seal face. Thus, the velocity pressure of the fluid entering the tube is converted at the seal faces to a static pressure that is sufficient to ensure that a thin film of process fluid is maintained between the seal faces to wet them.

Alternatively, the velocity recovery element can include a tube or passage that projects outwardly from the rotating seal into the seal chamber and that communicates with a passage to the rotating seal face. The open end of the element, which projects into the seal chamber, is directed into the process fluid, in the shaft's direction of rotation, to collect process fluid and channel it to the rotating seal face. The passage through the rotating seal ends at an enlarged exit pocket in the rotating seal face. When the element rotates with the pump shaft, the process fluid is scooped into the tube and the velocity head of the fluid entering the tube is converted to a static pressure at the rotating seal face. The increased static pressure drives the process fluid between the seal faces, providing lubrication and a path to the atmosphere.

The flow of the process fluid at the exit pockets in the respective seal face splits into a flow back into the seal chamber and a flow out to the pump shaft and out to the atmosphere. The radial location of the exit pocket relative to the shaft determines what portion of the process fluid flow goes back into the seal chamber and what portion goes out to the shaft. If a greater amount of the process fluid is desired to go back into the seal chamber, then the exit pocket is moved closer to the outside diameter of the seal. Conversely, if more of the process fluid is desired to flow out along the shaft and then to the atmosphere, then the exit pocket is moved closer to the inside diameter of the seal and to the shaft.

The inlet end of each velocity recovery element is located according to the amount of velocity recovery at the seal face that is desired. If a greater amount of velocity recovery is desired, then the inlet end is located closer to where the relative velocity between the inlet end and process fluid is greatest. If a lesser amount of recovery is desired, then the inlet end is located where the relative velocity is lowest. For a recovery element projecting into the seal chamber from the housing, greater velocity recovery is achieved by locating the inlet end closer to the rotating shaft. For a recovery element projecting from the rotating shaft, the relative velocity is greatest farther from the rotating shaft, and therefore greater velocity recovery is achieved by locating the inlet end farther away from the axis of the rotating shaft, closer to the outside wall of the seal chamber.

Other features and advantages of the present invention should be apparent from the following description of the preferred embodiments, taken in conjunction with the accompanying drawings, which illustrate, by way of example, the principles of the invention.

DESCRIPTION OF THE PREFERRED EMBODIMENTS

Figure 1:
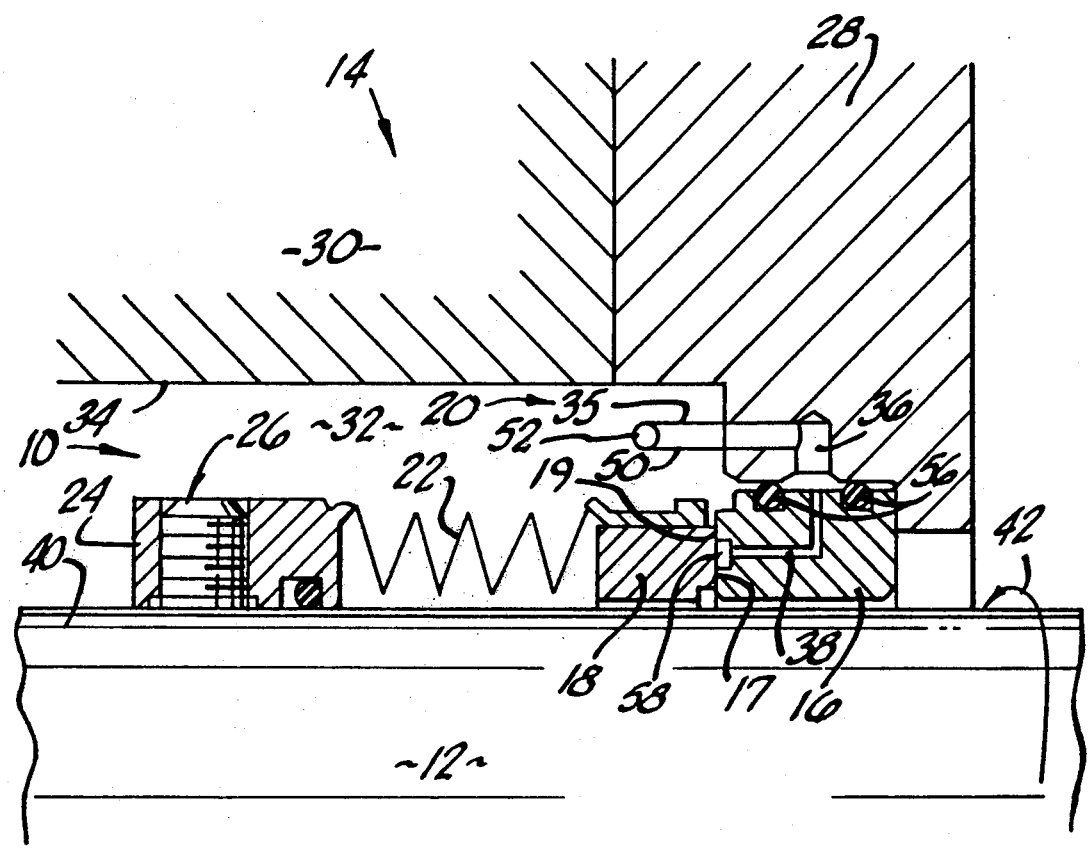
FIG. 1 is a cross-sectional view, taken along the longitudinal axis, of a mechanical seal assembly in accordance with the present invention.
Figure 2:
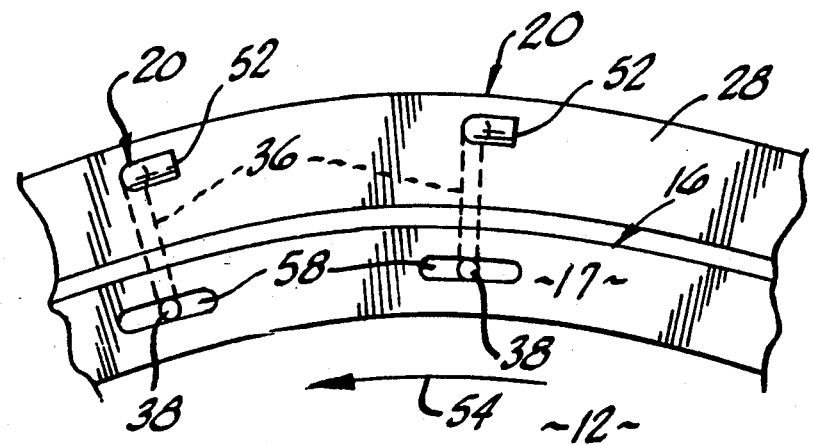
FIG. 2 is an end view of the housing and stationary seal of the FIG. 1 embodiment.

With reference to FIGS. 1 and 2, there is shown a mechanical seal assembly 10 in accordance with the present invention, for use in a centrifugal pump having an impeller shaft 12 rotating within a housing 14 and having an annular stationary seal 16 coupled to the housing and an annular rotating seal 18 coupled to the shaft for sealing a process fluid. The seal assembly includes a plurality of velocity recovery elements 20 that effectively convert the velocity pressure of the process fluid to an increased static pressure at the interface between the two seals 16 and 18. The converted velocity head counteracts the reduction in process fluid static pressure that occurs at the seals when the shaft 12 rotates. A bellows 22 or spring applies a force against the rotating seal 18, to press the rotating seal's face 19 against the stationary seal's face 17. An annular clamp 24 is attached to the rotating shaft with a screw 26 or other fastening means, to ensure that the bellows and rotating seal will remain coupled to, and rotate with, the shaft. The housing 14 can advantageously be formed from a first half 28 and a second half 30, for ease of disassembly and maintenance. Together, the two halves define a generally cylindrical seal chamber 32 having an outer wall 34 and containing the process fluid. The velocity recovery elements 20 maintain a positive process fluid static pressure at the seal interface between the seals 16 and 18 and maintain a thin film between them to ensure they will not run dry.

In FIG. 1, the longitudinal axis of the shaft 12 extends laterally across the drawing and the shaft rotates with its facing surface 40 turning into the drawing, in the direction of the arrow 42. Before the shaft begins rotating, the centrifugal pump of the seal assembly 10 is first filled with the process fluid that is to be pumped. Enough of the process fluid fills the impeller cavity (not shown) and travels up the shaft 12 from the left end of the shaft in FIG. 1 into the annular seal chamber 32 to fill the seal chamber and pressurize it to a static pressure typically about two times greater than atmospheric pressure, to approximately 29.4 pounds per square inch gage pressure, or approximately 44.1 pounds per square inch absolute (PSIA) pressure. Those skilled in the art will appreciate that, with some systems, the fluid in the seal chamber 32 might not be the process fluid and in other systems the fluid in the seal chamber might not be pressurized to greater than atmospheric pressure. The present invention is equally applicable to such systems.

When the shaft 12 begins to rotate, the surface 40 of the shaft and the rotating seal 18, bellows 22, and clamp 24 drag some of the process fluid along as they rotate in the seal chamber 32, driving the process fluid around the seal chamber. The velocity of the process fluid depends on the fluid's proximity to the rotating elements. For example, in the area near the rotating seal 18, the process fluid closest to the seal is driven to a speed approximately equal to the shaft speed, reducing its static pressure and giving it a velocity pressure. In contrast, the process fluid closer to the outside wall 34 of the seal chamber is driven to a lower speed and the process fluid immediately adjacent the outside wall is hardly driven at all, remaining still and maintaining its initial static pressure at approximately five atmospheres.

The rotating shaft 12 depicted in FIGS. 1 and 2 has a relatively large diameter of, for example, thirteen inches and therefore the shaft surface 40 has a relatively great speed relative to the process fluid at rest. A pump having a shaft of that size would ordinarily be run at relatively low speed, but it is possible for the pump to occasionally be run at speeds greater than its design. A rotational speed of 1800 revolutions per minute example, results in a shaft surface speed of 103 feet per second. Thus, the process fluid immediately adjacent the surface 40 of the shaft is driven to a speed of approximately 103 feet per second. Although the static pressure of the process fluid at rest near the outside wall 34 remains at the initial pressurized level, the static pressure of the process fluid at the shaft surface 40 and at the seal faces 17 and 19 is reduced to virtually zero and is converted to a velocity head approximately the initial level of two atmospheres. Because there is virtually no static pressure at the seal faces, there is no driving force to urge the process fluid between the seals. Hence, the seal faces can run dry or can even allow atmospheric air to enter the seal chamber 32. This can result in increased friction and damage to the seals 16 and 18.

In accordance with the present invention, the velocity recovery elements 20 recover the velocity head in the seal chamber 32 and convert it to an increased static pressure at the seal faces. In the embodiment illustrated in FIGS. 1 and 2, the velocity recovery elements comprise a number of hollow tubes 35 that are inserted into the first half 28 of the housing 14 and passages 36 through the housing that communicate with the hollow tubes. Each housing passage, in turn, communicates with a passage 38 through the stationary seal 16. Each hollow tube 35 includes a projecting portion 50 that ends in an open inlet 52 that is directed into the oncoming circulation of process fluid. This is best illustrated in FIG. 2, in which the arrow 54 indicates the direction of rotation of the shaft 12 and therefore indicates the relative circulation of the process fluid in the seal chamber 32. As the process fluid circulates in the seal chamber due to rotation of the shaft 12, a portion of the fluid will be collected by the inlet end 52 of the tube 35.

After the process fluid collected by the tube 35 leaves the passage 36 in the housing 28, the process fluid flows into the passage 38 in the stationary seal 16. Two O-rings 56 are located on opposite sides of the passage 36, between the housing 28 and the stationary seal 16. The O-rings prevent the collected process fluid from leaking between the housing and the seal back into the seal chamber 32 or out past the seal to the shaft 12 and the atmosphere. Instead, the collected process fluid has nowhere to go but into the stationary seal passage 38.

The stationary seal passage 38 ends at the stationary seal face 17, in an enlarged exit pocket 58 having an elongated, elliptical shape. The enlarged shape of the exit pocket distributes the process fluid across an enlarged area and ensures its distribution across the seal face. In fact, a single exit pocket can be all that is necessary to ensure distribution of the process fluid across the entire seal interface between the stationary seal 16 and the rotating seal 18. That is, enough of the process fluid can be distributed from a single exit pocket and then spread by the moving rotating seal 18 to ensure adequate lubrication between the two seal faces. Alternatively, depending on the application, more than one exit pocket might be necessary.

Generally, the fewer the number of exit pockets, the larger the size of each pocket. A design limitation of the number and size of the pockets will be the maximum loading for which the seals 16 and 18 are designed. That is, the bellows 22 presses the seals together with a particular clamping force. The seals are designed for a particular unit loading. Increasing the area of the exit pockets by increasing the number or size of the pockets will increase the unit loading of the seals. The optimal number of exit pockets will, in most cases, be between two and six. Regardless of the number of exit pockets 58 provided, it is contemplated that a tube 35 will be provided for each exit pocket.

The tube 35 can be attached to the housing 28 in a variety of ways. In the illustrated embodiment, the tube is pressed into the first leg of the housing passage 36 and is held in place by a friction fit. Alternatively, the tube can be attached to the housing through welding, gluing, or brazing. The tube can also be provided with threads that will engage with matching threads in the first leg of the housing passage 36. This is not preferred, however, because great care must be taken to ensure that, after the tubes have been threaded into the passages 36, the inlet end 52 is oriented to face into the relative flow of the process fluid. The tube can also be formed as part of the housing 28. In either case, properly orienting the inlet end ensures velocity head recovery and proper lubrication at the seal faces.

The amount of velocity head recovery and lubrication can be adapted for each specific application by selecting the number of recovery elements and their location. For example, it was noted above that the process fluid closest to the rotating seal 18 has the greatest velocity of the fluid in the seal chamber 32. Therefore, if a greater amount of velocity recovery is desired, meaning a greater flow of process fluid to the seal faces, then process fluid with a greater velocity head must be collected and hence the inlet end 52 of each recovery tube 35 must be located closer to the rotating seal. If a lesser amount of velocity recovery is desired, then the inlet end is located farther from the rotating seal 18 and closer to the outer diameter 34 of the seal chamber 32. In this way, the radial position of the inlet end governs the amount of velocity head recovery.

The amount of velocity head recovery and lubrication is also influenced by the radial location of the exit pockets 58 in the stationary seal 16. When the process fluid leaves the stationary seal passage 38 and is distributed from the exit pocket in a film, part of the process fluid film moves radially outward back into the seal chamber 32 toward the outer diameter 34 and part of the process fluid film moves radially inward toward the shaft 12. If a greater lubricating film of the process fluid to the shaft is desired, then the exit pocket 58 is located radially inward, closer to the shaft 12. If a reduced lubricating film of process fluid to the shaft is desired, then the exit pocket is located radially outward, away from the shaft.

Figure 3:
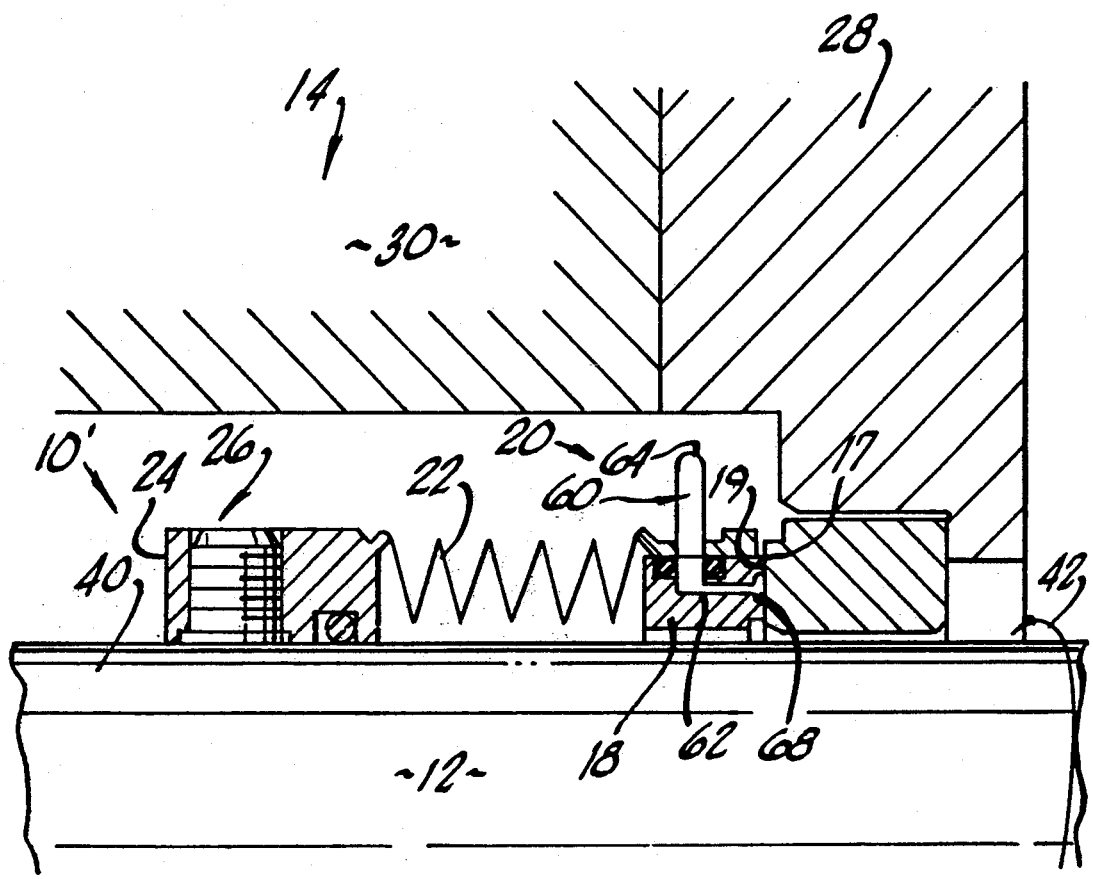
FIG. 3 is a cross-sectional view, taken along the longitudinal axis, of a second embodiment of a mechanical seal assembly in accordance with the present invention.
Figure 4:
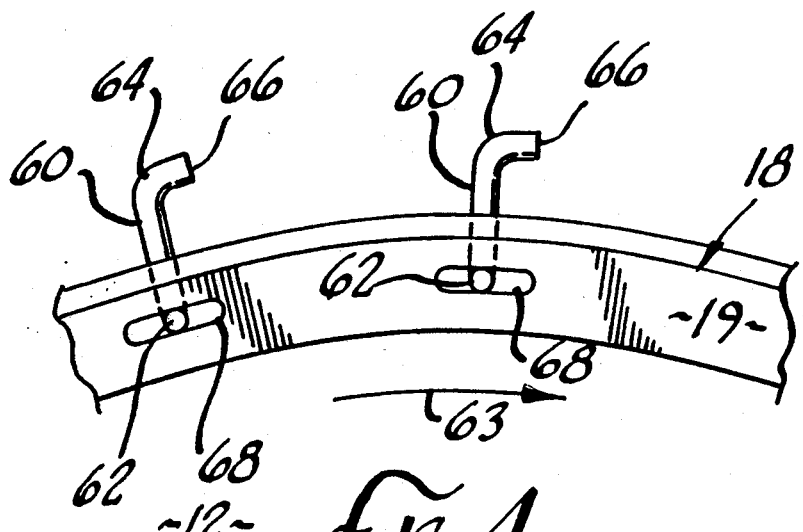
FIG. 4 is an end view of the rotating seal of the mechanical seal assembly illustrated in FIG. 3.

In a second embodiment of the present invention, depicted in FIGS. 3 and 4, the velocity recovery elements 20 of a mechanical assembly 10' comprise a number of hollow tubes 60 or passages that are inserted into the rotating seal 18 and passages 62 through the rotating seal that communicate with the hollow tubes. Each tube includes a projecting portion 64 that ends in an open inlet 66 that is directed into the process fluid in the shaft's direction of rotation. As the shaft rotates in the direction of the arrow 63, the open tube 60 scoops up process fluid into the tube and directs it out the rotating seal passage 62 to the seal face 19. Thus, the velocity pressure of the process fluid entering the tube is converted to a static pressure at the seal interface. Each rotating seal passage 62 ends in an enlarged exit pocket 68 having an elongated, elliptical shape similar to the exit pocket 58 described above in connection with FIGS. 1 and 2. Again, the enlarged shape of the exit pocket 68 distributes the process fluid across an enlarged area and ensures its distribution across the rotating seal face and into the gap between the two seals.

As before, a single exit pocket can be all that is necessary to ensure distribution of the process fluid across the entire seal interface, depending on the size and location of the exit pocket. Thus, enough of the process fluid can be distributed from a single exit pocket in the rotating seal 18 and then spread by relative motion between the rotating seal and the stationary seal 16 to ensure adequate lubrication between the two seal faces 17 and 19. Again, a projecting tube 60 is contemplated for each rotating seal exit pocket 68.

Also, as before, the amount of velocity head recovery and lubrication can be adapted for each specific application by selecting the number of recovery elements and their location. The further the inlet end 66 of each recovery tube 60 is located from the rotating seal 18, the greater the relative velocity between the process fluid and the inlet end, and therefore the greater the amount of velocity recovery. The closer the inlet end is to the rotating seal (and the farther it is from the outer diameter 34 of the seal chamber 32), the less the velocity recovery. If a greater lubricating film is desired, then the exit pocket 68 is located radially inward, closer to the shaft 12, and if a reduced lubricating film to the shaft is desired, then the exit pocket 68 is located radially outward, away from the shaft. Finally, the tube 60 can be attached to the rotating seal 18 by a friction fit or through welding, gluing, brazing, or by threaded engagement.

From the foregoing, it will be appreciated that the centrifugal pump mechanical seal assembly in accordance with the invention compensates for the reduced static pressure of the process fluid at the seal faces by converting the velocity head of the circulating process fluid into static pressure at the seal faces and thereby replacing the reduction in static pressure caused by rotation of the shaft. Furthermore, the degree of static pressure recovery can be precisely selected by positioning the inlet end of the velocity recovery elements in the seal chamber, by positioning the exit pockets in the seal faces, and by selecting the size and number of exit pockets. The mechanical seal assembly in accordance with the present invention prevents the seal faces from running dry and does not require internal pressurization of the seal chamber. Thus, mechanical seal assemblies in accordance with the invention can be used to maintain a lubricating film between the seal faces where pressurization is not practical.

Figure 5:
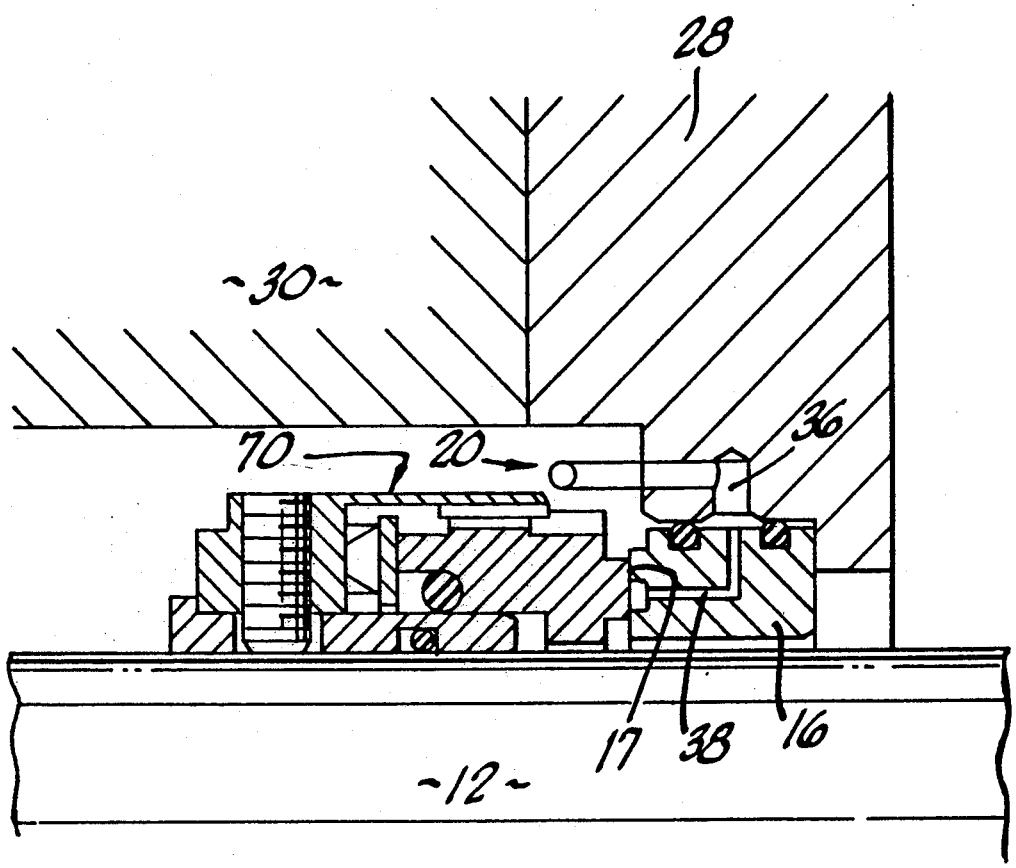
FIG. 5 is a cross-sectional view, taken along the longitudinal axis, of a mechanical seal assembly similar to that of FIG. 1, but with a pusher spring in place of a bellows.

The present invention has been described above in terms of presently preferred embodiments so that an understanding of the present invention can be conveyed. There are, however, many configurations for mechanical seal assemblies not specifically described herein, but with which the present invention is applicable. The present invention should therefore not be seen as limited to the particular embodiments described herein, but rather, it should be understood that the present invention has applicability with respect to mechanical seal assemblies in a variety of designs and applications. For example, FIG. 5 shows a mechanical seal assembly similar to that of FIG. 1, except that the FIG. 1 bellows 22 has been replaced with a pusher spring assembly 70. The velocity recovery element 20 again captures process fluid and converts its velocity head to a static pressure at the seal face 17. All modifications, variations, or equivalent arrangements that are within the scope of the attached claims should therefore be considered to be within the scope of the invention.

I claim:

1. A mechanical seal assembly for use with a fluid pumping system having a housing, a shaft rotating within the housing, and an annular cavity around a portion of the shaft, defining a seal chamber, the assembly comprising:

a stationary seal located axially around the shaft such that it does not move relative to the housing and includes a relatively planar stationary seal face oriented radially around the circumference of the shaft;

a rotating seal located axially around the shaft such that it rotates relative to the housing and includes a relatively planar rotating seal face oriented radially around the circumference of the shaft and adjacent the stationary seal face;

an incompressible process fluid that substantially fills the seal chamber and generates a velocity pressure due to its circulation in the seal chamber when the shaft rotates; and means for converting the velocity pressure of the circulating process fluid in the seal chamber to a positive static pressure at the stationary seal and rotating seal faces; said means for converting comprising:

at least one pathway extending from the seal chamber through the rotating seal to an exit pocket at the stationary seal/rotating seal faces; and a pressure recovery tube projecting from the beginning of the pathway at the seal chamber outwardly into the seal chamber with an open end disposed radially outwardly from the exit pocket and facing in the direction of the circulating process fluid, wherein the process fluid that is circulating within the seal chamber due to rotation of the shaft flows into the pressure recovery tube, into the pathway, through the exit pocket, and to the stationary seal/rotating seal faces.

2. A mechanical seal assembly for use with a fluid pumping system having a housing, a shaft rotating within the housing, and an annular cavity around a portion of the shaft, defining a seal chamber, the assembly comprising:

a stationary seal located axially around the shaft such that it does not move relative to the housing and includes a relatively planar stationary seal face oriented radially around the circumference of the shaft;

a rotating seal located axially around the shaft such that it rotates relative to the housing and includes a relatively planar rotating seal face oriented radially around the circumference of the shaft and adjacent the stationary seal face;

an incompressible process fluid that substantially fills the seal chamber and generates a velocity pressure due to its circulation in the seal chamber when the shaft rotates; and means for converting the velocity pressure of the circulating process fluid in the seal chamber to a positive static pressure at the stationary seal and rotating seal faces; said means for converting comprising:

at least one pathway extending from the seal chamber through the stationary seal to an exit pocket at the stationary seal/rotating seal faces; and a pressure recovery tube projecting from the beginning of the pathway at the seal chamber outwardly into the seal chamber with an open end facing against the direction of circulating process fluid, wherein process fluid that is circulating within the seal chamber due to rotation of the shaft flows into the pressure recovery tube, into the pathway, through the exit pocket, and to the stationary seal/rotating seal faces.

3. A mechanical seal assembly as defined in claim 2, wherein the pathway extends from the seal chamber through the housing and then through the stationary seal.

4. A mechanical seal assembly, to be used with a shaft that rotates within a housing having a seal chamber filled with a process fluid so as to prevent the loss of fluid from the seal chamber, including a stationary seal that is fixed relative to the housing and a rotating seal that rotates relative to the housing, the stationary seal and rotating seal having adjacent seal faces defining a seal interface, the mechanical seal assembly further including:

at least one pressure recovery tube having an end opening oriented in the direction of the circulating process fluid in the seal chamber to collect a portion of the process fluid that is circulating in the seal chamber when the shaft is rotating and produce a flow of process fluid having a velocity pressure into the tubes;

conduit means for providing the flow of process fluid from the pressure recovery tube to an exit pocket at the seal interface, said conduit means comprising a pathway through the rotating seal that extends from the pressure recovery tube to the exit pocket at the seal interface and wherein said end opening is disposed radially outwardly of the exit pocket.

5. A mechanical seal assembly to be used with a shaft that rotates within a housing having a seal chamber filled with a process fluid so as to prevent the loss of fluid from the seal chamber, including a stationary seal that is fixed relative to the housing and a rotating seal that rotates relative to the housing, the stationary seal and rotating seal having adjacent seal faces defining a seal interface, the mechanical seal assembly further including:

at least one pressure recovery tube having an end opening oriented against the direction of the circulating process fluid in the seal chamber to collect a portion of the process fluid that is circulating in the seal chamber when the shaft is rotating and produce a flow of process fluid having a velocity pressure into the tube;

conduit means for providing the flow of process fluid from the pressure recovery tube to an exit pocket at the seal interface, said conduit means comprising both a pathway through the housing extending from the pressure recovery tube to the stationary seal and a pathway through the stationary seal from the housing end of the pathway to the exit pocket at the seal interface.

6. A mechanical seal assembly for use with a shaft rotating within a housing that includes an annular cavity, defining a seal chamber around a portion of the shaft, the mechanical seal assembly comprising:

a generally circular stationary seal, located around the shaft such that it does not move relative to the housing, that includes a relatively planar stationary seal face projecting outwardly from around the circumference of the shaft;

a generally circular rotating seal that includes a relatively planar rotating seal face, the rotating seal being located around the shaft such that it rotates relative to the housing and is adjacent the stationary seal face, defining a seal interface;

an incompressible process fluid that substantially fills the seal chamber and generates a velocity head from movement in the seal chamber when the shaft rotates; and flow means for providing a flow of process fluid from the seal chamber through one of the seals to the seal interface, said flow means comprising:

at least one hollow tube that projects from the housing into the seal chamber and includes an open first end that faces in a direction opposite to the shaft's direction of rotation and terminates at a second end;

a housing passage through the housing with a first passage end that communicates with the tube's second end and with a second passage end adjacent the stationary seal; and a stationary seal passage through the stationary seal that communicates with the second end of the housing passage and that terminates at the stationary seal face in an enlarged pocket.

7. A mechanical seal assembly for use with shaft rotating within a housing that includes an annular cavity, defining a seal chamber around a portion of the shaft, the mechanical seal assembly comprising:

a generally circular stationary seal, located around the shaft such that it does not move relative to the housing, that includes a relatively planar stationary seal face projecting outwardly from around the circumference of the shaft;

a generally circular rotating seal that includes a relatively planar rotating seal face, the rotating seal being located around the shaft such that it rotates relative to the housing and is adjacent the stationary seal face, defining a seal interface;

an incompressible process fluid that substantially fills the seal chamber and generates a velocity head from movement in the seal chamber when the shaft rotates; and flow means for providing a flow of process fluid from the seal chamber through one of the seals to the seal interface, said flow means comprising:

at least one hollow tube that projects radially outwardly from the rotating seal into the seal chamber and includes a radially outward open first end that faces into the shaft's direction of rotation and that terminates in a radially inward second end; and a rotating seal passage through the rotating seal having a first passage end that communicates with the tube's second end and having a second passage end that terminates at the rotating seal face in an enlarged pocket.

8. A system for providing a continuous flow of a process fluid located within a seal chamber of a mechanical seal assembly that seals a rotating shaft and that has a stationary seal and a rotary seal with adjacent seal faces that form a seal interface, the system comprising:

at least one pathway extending from the stationary seal/rotary seal interface through the stationary seal to the seal chamber; and a pressure recovery tube extending from the end of the pathway at the seal chamber into the seal chamber with an open end facing against the direction of flow of the process fluid, wherein fluid that is flowing within the seal chamber due to rotation of the shaft flows into the pressure recovery tube, into the pathway, and to the stationary seal/rotary seal interface.

9. A system for providing a continuous flow of a process fluid located within a seal chamber of a mechanical seal assembly that seals a rotating shaft and that has a stationary seal and a rotary seal with adjacent seal faces that form a seal interface, the system comprising:

at least one pathway extending from the stationary seal/rotary seal interface through the rotating seal to the seal chamber; and a pressure recovery tube extending from the end of the pathway at the seal chamber into the seal chamber with an open end disposed radially outwardly of the stationary seal/rotary seal interface and facing into the direction of flow of the process fluid, wherein fluid that is flowing within the seal chamber due to rotation of the shaft flows into the pressure recovery tube, into the pathway, and to the stationary seal/rotary seal interface.

* * * * *